UNITED STATES PATENT OFFICE.

J. LEWIS GEROLDSEK, OF LIVINGSTON, NEW YORK, ASSIGNOR TO HENRY W. LIVINGSTON.

IMPROVED PAINT.

Specification forming part of Letters Patent No. 56,322, dated July 10, 1866.

*To all whom it may concern:*

Be it known that I, J. LEWIS GEROLDSEK, of the town of Livingston, in the county of Columbia and State of New York, have invented a new and Improved Composition for Painting, possessing the durable and adhesive qualities of linseed-oil, which I call "hydroleum;" and I do hereby declare that the following is a full and complete description thereof, and of the process of compounding the same.

I put thirty gallons of soft water into a cask or barrel which will contain not less than forty gallons. Then, in six or eight gallons of boiling or hot water, I dissolve five pounds of blue vitriol and half a pound of potash. I also dissolve one pound of glue separately in warm water, and then add the whole (blue vitriol, potash, and glue) to the thirty gallons of water in the cask. I then add to the same one-quarter of a pound of alum, two pounds litharge, one pint of linseed-oil, and two ounces of aquafortis; then, for the purpose of giving the requisite color, I add to the whole a sufficient quantity of water to make up the forty gallons, in which has been previously boiled a quarter of a pound of yellow-wood with four ounces of dry chrome-yellow.

This makes a liquid for mixing colored paints which possesses the drying and adhesive qualities of linseed-oil at a cost of about one-eighth the value of linseed-oil, and which will spread over as large a surface, and when exposed to the weather is more durable than linseed-oil.

I do not intend to confine myself to the exact quantities or proportions of the ingredients above mentioned, because trifling variations may be made therein and yet the same or similar results obtained.

What I claim as my invention, and desire to secure by Letters Patent of the United States, is—

The composition of materials and the process of compounding the same, substantially as set forth in the foregoing specification.

J. LEWIS GEROLDSEK.

Witnesses:
ALEX. S. ROWLEY,
C. L. HERRICK.